UNITED STATES PATENT OFFICE.

ROBERT WAHL, OF CHICAGO, ILLINOIS.

MANUFACTURE OF FERMENTED MALT BEVERAGES.

1,006,154.

No Drawing.

Specification of Letters Patent. Patented Oct. 17, 1911.

Application filed September 14, 1911. Serial No. 649,241.

*To all whom it may concern:*

Be it known that I, ROBERT WAHL, a citizen of the United States, residing at Chicago, in the county of Cook and State of Illinois, have invented a new and useful Improvement in the Manufacture of Fermented Malt Beverages, of which the following is a specification.

My invention relates to an improvement in the manufacture of fermented malt beverages generally, including beer, tonics, ale, stout, and the like, to the end of augmenting their keeping quality and, besides, to render them of superior grade by adding zest and palate fullness thereto. I have more immediately devised my improvement for beer, however, and especially for bottled beer, and I therefore mainly confine to the latter the description hereinafter contained because it is particularly important that bottled beer, in producing it, be stabilized, meaning that it be rendered of a high degree of durability, since there is no certainty when it will be consumed after leaving the brewery, as it may be in transit to its destination for weeks and may thereafter be kept for months before it is consumed.

All beers contain albuminoids dissolved out of the malt during the mashing process. An enzym termed "peptase," contained in the malt, acts upon the highly molecular albuminoids, or such as are either insoluble or not readily soluble, to break them down to lower molecular albumenous compounds, such as albumose, peptones and amino-acids, all of which are readily soluble. This process of breaking down the albuminoids is not completed in the meshing step, much of the albumen remaining unaffected by the peptase and being thrown out with the "grains." Between the totally-insoluble albuminoids thus disposed of in the grains, and the named completely-soluble albuminoids, many intermediate compounds are recognized but not yet thoroughly understood in the art. Of these highly-molecular albuminoids some are thrown out of the solution by boiling the wort when they form a coagulate; and others, remaining in solution during the gradual boiling, become insoluble in the wort and later in the beer under the cooling or chilling influences to which the liquid is subjected in the course of manufacture, and these gradually settle in the storage-tanks or chip-casks under the chilling of the liquor therein, upon which chilling the brewer has heretofore relied for getting rid of this objectionable albumen to thus reduce to the minimum haze or sedimentation in the beer after bottling. However clear, though, the beer may be on entering the bottles, after subjecting it to the final step of pasteurization and then keeping it at ordinary temperatures, of say 60° F. to 90° F., it deteriorates in time, so that when, after about ten days to two months, the bottles are chilled, as by placing them on ice, their contents become hazy, or turbid, and precipitate a sediment, thereby rendering the beer unsightly and besides, in time and especially under exposure to light, imparting thereto an obnoxious odor, termed in the art "skunky." Moreover, the temperature of pasteurization (130° F. to 150° F.) exerts a detrimental influence on the taste, flavor, and color of the beer, and tends to increase its sensitiveness to the injurious effect of low temperature on icing it; and it also imparts to the beer a more or less pronounced, but objectionable "bready" taste. The undesirable results thus referred to are largely due to the presence of the aforesaid highly molecular albuminoids in the finished beer and their becoming insoluble by chilling it.

Albuminoids of another class, but similar to though still more complex in composition than those above mentioned, and which also affect injuriously the keeping quality of the beer, are produced by a combination of the tannin in the hops, when boiled in the wort, with the albumose and peptones contained in the latter. The action of these tennates of albumose and peptones is similar to that described of the incompletely transformed albuminoids of the malt.

The object of my invention is to rid the beer, in the course of its manufacture, of these highly molecular albuminoids with their objectionable effects, by transforming them through the medium of digestion, and to this end I provide the treatment hereinafter described.

My improved treatment consists in adding to the beer, at any suitable stage of brewing, but preferably after the main fermentation, the acid extracted soluble substances of malt, containing, besides the acid and the inactive extractive substances of malt, peptase to act digestively on the objectionable albuminoids contained in the beer, the acid extracted soluble substances of malt to be prepared in the following manner: Malt, kiln-dried or green malt, is extracted with dilute acid, preferably lactic acid, it being undesirable to effect the extraction with non acidulated water, because the latter dissolves considerable coagulable albuminous matter which, when the malt extract is added to beer, coagulates under pasteurization thereof, thereby rendering the beer more hazy because of using such extract; whereas when the extract is made with an acidulated solution of about one per cent. to two per cent. strength, the acid so modifies the albumen as to avoid precipitation, such albumen being partly or wholly peptonized by the action of the acid. For this solution a dilute acid may be employed prepared from a suitable acid on the market, such as lactic acid, sulfuric acid or phosphoric acid; but as it is preferable, to avoid introducing into the beer any chemical or foreign substance whatsoever, I produce the acid from malt by subjecting a mixture of preferably about one part of malt and three parts of water, which may be termed a mash, to a temperature of 50° C. to 60° C. preferably in accordance with the procedure described in Letters Patent No. 978,810 granted to me December 27, 1910, wherein the mash is maintained at that temperature for about thirty minutes to destroy all organisms except the one to be propagated for producing the desired acid. By holding the temperature of this mash to 50° C. to 55° C. for about twenty-four to forty-eight hours, from one to two per cent. of lastic acid is formed. The liquor is then drawn off and thoroughly mixed with finely crushed malt, in the preferred proportions of one part of the malt to four parts of the acidulated liquor, to extract the digestive principle of the malt, peptase, the acid liberating and making more effective the enzymes of the fresh malt and, at the same time, promoting the dissolution and peponization of its contained coagulable albumen. Before mixing the acidulated liquor with the fresh malt the liquor should be cooled preferably to near the freezing point or sufficiently to minimize or paralyze the peptonizing action on the albuminoids of the malt, since it is upon the digestive action of this peptase on the highly molecular albuminoids still contained in the beer to be treated, that the effectiveness of my process largely depends; and this digestive action would be materially reduced in power, or spent, if the malt were treated by a temperature to exert such action on the albumen of the malt from which the digestive agents are extracted, for example at a temperature of 60° F. to 140°.

The acid used in making the solution not only peptonizes the objectionable albuminoids in the solution itself, but when the acid solution is added to the beer for the purpose of digesting the albuminoids thereof by the peptase of such solution, the acid itself aids in such action, and as a matter of fact will remain in the beer unaffected by the heat of pasteurization to exert such peptonizing action after pasteurization.

The acidulated liquor thus prepared to provide the peptase for its digestive action upon the albuminoids contained in beer to be treated, is added to the latter, in the preferred proportions of about 1 part of the liquor to 100 parts of the beer, preferably in the storage or finishing cask. The desired digestive action of the peptase proceeds gradually at the prevailing low temperatures of the beer in the aforesaid casks in two or three weeks, and no action is further expected of it by the heat of pasteurization since the latter impairs or destroys the peptase, thereby permanently preventing further activity thereof, while the acid used for extraction of the malt aids in such action especially during pasteurization breaking up whatever proteids may have escaped the action of the peptase at low temperatures and remaining unaffected by the heat of pasteurization, as aforesaid, will continue to exert such peptonizing action after pasteurization.

The acidulated solution for extracting the digestive principle from the crushed malt should be of about one to two per cent. strength to so modify the albumen as to avoid precipitation or coagulation thereof by the heat of pasteurization; and by using lactic-acid extracted from malt I avoid introducing into the beer any chemical or foreign substance whatsoever.

While I have specified herein only malt, as such, for use in preparing the acid-extracted soluble substances for addition to the beer, I wish to be understood as also intending for such use, any kind of malt, or form or part of malt including green malt, malt sprouts, malt-cleaning and the like.

The result of the described digestive treatment is not only greatly increased keeping quality of the beer, rendering it "chill-proof," retentive of its color, freshness of taste and flavor, but it is also found to render the beverage superior in the matter of high grade quality in all respects, increasing palate fullness on account of the proteolytic action on the albuminoids in the malt extract and beer and zest on account of the acid.

I am aware that peptase has been extracted from malt and freed from objectionable albuminoids by a process of precipitating it from an extract of green malt by the addition of alcohol, and drying the precipitate in vacuo.

I am also aware that peptase may have been obtained practically free from objectionable albumen by similar methods long known in the art and described by Windisch and Schellhorn, Fernbach and Hubert, Weiss, and Wallerstein, but all these methods have only experimental value and are not suggestive of the fundamental idea of getting rid of the injurious effect of these coagulable albuminoids by peptonizing them and thus changing them to desirable substances, at the same time obtaining by the addition of the acid extracted substances of malt to beer the effect on the objectionable albuminoids of beer at low temperatures without the assistance of pasteurizing heats and the effect of the acid on similar peptonization with the effect of pasteurization heats.

What I claim as new and desire to secure by Letters Patent is:

1. The process of treating beer, in the manufacture thereof, to free it from objectionable albuminoids in the finished product, which consists in adding to the beer the acid-extracted soluble substances of malt in solution and containing the peptase thereof and the albuminoids dissolved and peptonized by the solvent and proteolytic action of the acid used in extracting said malt, thereby rendering said solution practically free of objectionable proteid matter, whereby the peptase of the solution will digest the albuminoids of the beer.

2. The process of treating beer, in the manufacture thereof, to free it from objectionable albuminoids in the finished product, which consists in adding to the beer the lactic-acid extracted soluble substances of malt in solution and containing the peptase thereof and the albuminoids dissolved and peptonized by the solvent and proteolytic action of the acid used in extracting said malt, thereby rendering said solution practically free of objectionable proteid matter, whereby the peptase of the solution will digest the albuminoids of the beer.

3. The process of treating beer, in the manufacture thereof, to free it from objectionable albuminoids in the finished product, which consists in adding to the beer the malt derived lactic-acid extracted substances of malt in solution and containing the peptase thereof and the albuminoids dissolved and peptonized by the solvent and proteolytic action of the acid used in extracting said malt, thereby rendering said solution practically free of objectionable proteid matter, whereby the peptase of the solution will digest the albuminoids of the beer.

4. The process of treating beer, in the manufacture thereof, to free it from objectionable albuminoids in the finished product, which consists in adding to the beer the acid-extracted soluble substances of malt in solution and containing the albuminoids thereof dissolved and peptonized by the solvent and proteolytic action of the acid used in extracting said malt, the peptase of said malt and said acid, said solution being practically freed from objectionable proteid matter, whereby the peptase of the solution will digest the albuminoids of the beer.

In testimony whereof I affix my signature in presence of two witnesses.

ROBERT WAHL.

Witnesses:
F. L. BROWNE,
FRANCIS M. PHELPS.